(12) United States Patent
Waser et al.

(10) Patent No.: US 8,281,664 B2
(45) Date of Patent: Oct. 9, 2012

(54) MEASURING ARRANGEMENT IN AN INJECTION-MOULDING SYSTEM

(75) Inventors: Max Waser, Hittnau (CH); Ernst Pletscher, Marthalen (CH)

(73) Assignee: Kistler Holding AG, Winterthur (CH)

( * ) Notice: Subject to any disclaimer, the term of this patent is extended or adjusted under 35 U.S.C. 154(b) by 315 days.

(21) Appl. No.: 12/681,155

(22) PCT Filed: Oct. 8, 2008

(86) PCT No.: PCT/CH2008/000418
§ 371 (c)(1),
(2), (4) Date: Apr. 1, 2010

(87) PCT Pub. No.: WO2009/052641
PCT Pub. Date: Apr. 30, 2009

(65) Prior Publication Data
US 2010/0242616 A1    Sep. 30, 2010

(30) Foreign Application Priority Data
Oct. 22, 2007   (CH) ........................................ 1649/07

(51) Int. Cl.
*G01L 7/00* (2006.01)
(52) U.S. Cl. ........................................................ 73/714
(58) Field of Classification Search ................. None
See application file for complete search history.

(56) References Cited

U.S. PATENT DOCUMENTS
7,476,095 B2 *   1/2009   Bader et al. ................... 425/170

FOREIGN PATENT DOCUMENTS
| DE | 3939728 | 6/1991 |
|---|---|---|
| DE | 19806121 | 9/1999 |
| DE | 102004043443 | 2/2006 |

OTHER PUBLICATIONS

English translation of International Preliminary Examination Report on Patentability, issued May 11, 2010.
Gao R X et al "Energy Extraction for a Self-Energized Pressure Sensor", IEEE Sensors Journal, IEEE Service Center, NewYork, NY, Feb. 1, 2001.
Mizier M-O "Mesures Sur Machines Tournantes Une Solution: La Telemesure", Measures Regulation Automatisme, CFE., Paris, France, Jun. 20, 1988.

* cited by examiner

*Primary Examiner* — Andre Allen
(74) *Attorney, Agent, or Firm* — Dority & Manning, P.A.

(57) ABSTRACT

A measuring arrangement for measuring one or more pressures and/or temperatures in an injection-molding system includes a base plate and at least one mould insert with at least part of a cavity. The base plate and the mould insert rest against one another in a releasable manner on at least one common separating surface. The mould insert includes at least one sensor for detecting pressures and/or temperatures as well as a transmitter module on the separating surface, which transmitter module is electrically connected to the sensor. The base plate includes a receiving module on the separating surface opposite the transmitter module, wherein measurement data can be transmitted from the transmitter module to the receiving module. The transmitter module and the receiving module on the separating surface are essentially planar and can be separated without force.

18 Claims, 6 Drawing Sheets

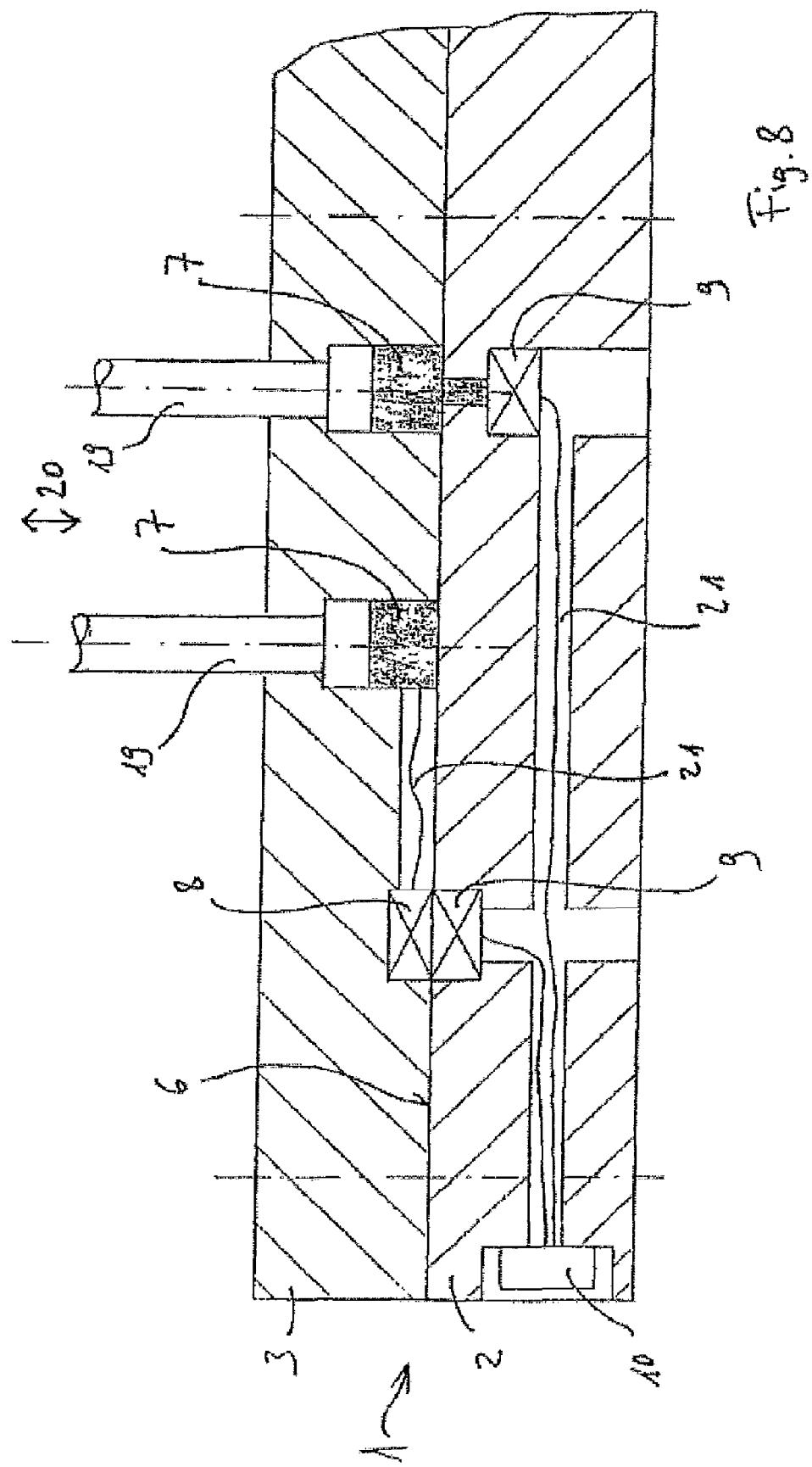

MEASURING ARRANGEMENT IN AN INJECTION-MOULDING SYSTEM

CROSS-REFERENCE TO RELATED APPLICATIONS

This application claims priority to International Application Serial No. PCT/CH2008/000418 filed Oct. 8, 2008, which claims priority to Swiss Application No. CH 01649/07 filed Oct. 22, 2007.

TECHNICAL FIELD

The invention relates to a measuring arrangement for measuring one or more pressures and/or temperatures in an injection-molding system.

BACKGROUND

Measuring arrangements are known to comprise a base plate and at least one mold insert with at least part of a cavity wherein the base plate and the mold insert rest against one another in a releasable manner on at least one common separation surface, as well as at least one sensor within the mold insert for the detection of pressures and/or temperatures wherein the measurement data can be transmitted from the base plate to an evaluation device. Measuring arrangements such as those described are routinely used in injection molding technology. In particular, the measuring arrangement is intended to provide data for controlling an injection molding process. Problems are encountered with the leads of the sensors which require a connection from the mold insert into the base plate. Once these two components are separated from each other the leads may be damaged or may come off on the sensor side so that the sensors must be replaced. It is very expensive to repair such damages.

A known solution is described in DE 10 2004 043 443 B3. This patent uses coupling elements on the common separation surface which engage each other once the base plate is combined with the mold insert. It is a disadvantage of this arrangement that there is the risk of contamination accompanied by laborious cleaning as well as the risk that both coupling parts that protrude from the mold components on at least one side are damaged when the mold is opened. Furthermore, very precise closing is necessary so as not to damage the coupling parts during assembly. In addition, the measuring arrangement described restricts the free choice of the mounting site of the coupling parts since engagement of the coupling parts must always occur in the same direction.

OBJECTS AND SUMMARY OF THE PRESENT INVENTION

It is an object of the present invention to provide a measuring arrangement of the type described in the beginning that ensures the transmission of measurement data to the evaluation device and is protected from contamination and damage also when the mold is in the disassembled state.

In many cases, commercially available elements cannot be used in measuring arrangements for the transmission of measurement data because they are much too big and/or too expensive, for example in injection molding systems having small cavities.

The object of the invention has been achieved by the features that are described herein.

The idea underlying the present invention is to attach to both sides on the common separation surface opposite one another a transmitter module and a receiving module for the transmission of measurement data, which transmitter module and a receiving module are essentially planar and can be separated without force.

Because it is possible to separate the transmitter module and the receiving module from each other without force, these modules are not subjected to forces, in particular transversal forces, which otherwise might be applied during opening and lead to early damage of these modules. In addition, the planarity of the modules ensures that these modules do not engage and thereby damage each other. Another advantage of planarity is that planar surfaces can be kept clean easily and can be cleaned without effort. Since the modules are never pulled during separation, no force acts on their mounting elements and in no case on the cables connected thereto.

Another advantage of the measuring arrangement of the invention is that the modules can be disposed on a plane that has any desired orientation with respect to the direction of separation of the two mold components, i.e. base plate and mold insert. In particular, the separation plane can be in the direction of movement. In contrast, the above-mentioned prior art device must be located on a plane that is perpendicular to the direction of movement which is a considerable limitation.

BRIEF DESCRIPTION OF THE DRAWINGS

In the following the invention will be explained in more detail with respect to the drawings in which

FIG. 8 shows a schematic representation of a measuring arrangement according to the invention with a sensor arranged behind an ejector pin.

DETAILED DESCRIPTION OF EXEMPLARY EMBODIMENTS

Figure 1:
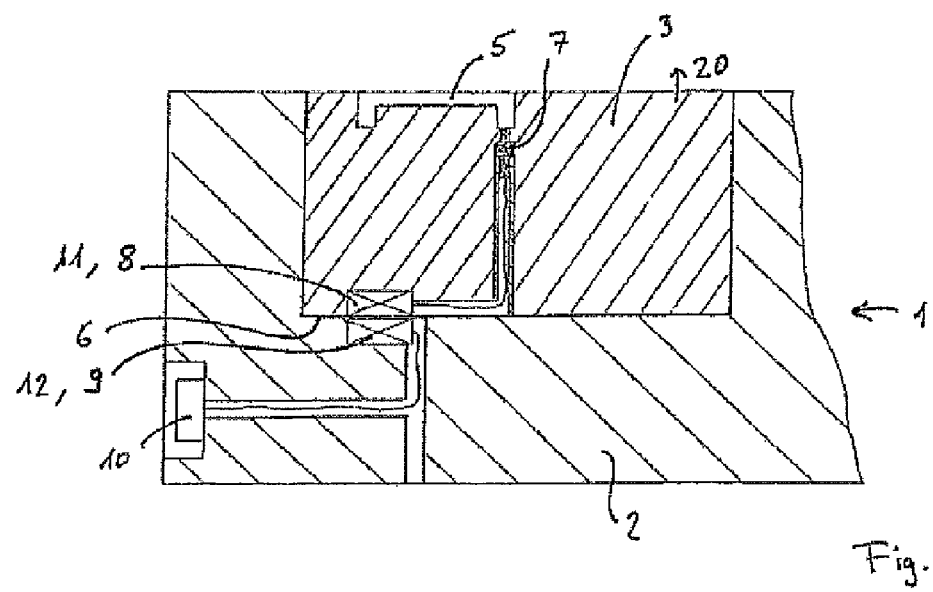
FIG. 1 shows a schematic representation, in sectional view, of a measuring arrangement according to the present invention.

The reference numerals are the same in all Figures.

FIG. 1 shows a partial assembly of a portion of an injection molding system 1 comprising a base plate 2 and a mold insert with at least part of a cavity 5. The base plate 2 and the mold insert 3 are releasable from each other in a direction of movement 20 and have at least one common separation surface 6. Within the mold insert 3 is attached a sensor 7 for the detection of measurement data, for example pressures and/or temperatures, in the cavity 5. In particular, the sensor 7 can be a piezoelectric pressure sensor or a thermocouple. A transmitter module 8 in the mold insert 6 on the separation surface 6 is electrically connected to the sensor 7. In the base plate 2 also on the separation surface 6 and opposite the transmitter module 8 is attached a receiving module 9 whereby the transmitter module 8 can transmit measurement data acquired by the sensor 7 to the receiving module 9. The receiving module 9 is electrically connected to a connector 10 which can be connected to an evaluation device (not shown) for analyzing the measurement data.

Specifically, the injection molding system 1 can comprise several base plates 1 and, if required, also several mold inserts 3 having common separation surfaces 6 each including transmitter modules 8 and receiving modules 9 disposed opposite one another.

According to the invention, the transmitter module 8 and receiving module 9 are essentially planar, do not engage each other and are not attached to each other. At most, they are disposed side by side and touch each other. In this way, they can be separated from each other without applying a force. Specifically, they can also be pushed tangentially along the separation surface 6. This forceless separation prevents wear during opening and closing of the components 2, 3 of the injection molding system 1 on the separation surface 6. Especially, this enables an unrestricted selection of the mounting site of the modules 8, 9 on any possible separation surface 6. In each case, the measurement signals can be transmitted from a mold insert 3 to a base plate 2.

Figure 2A:
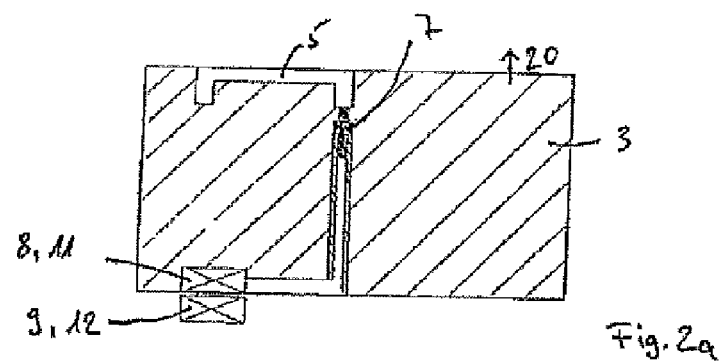
FIG. 2 shows a schematic representation, in sectional view, of measuring arrangements of the invention with three different configurations of the separation surfaces.
Figures 2B, 2C:
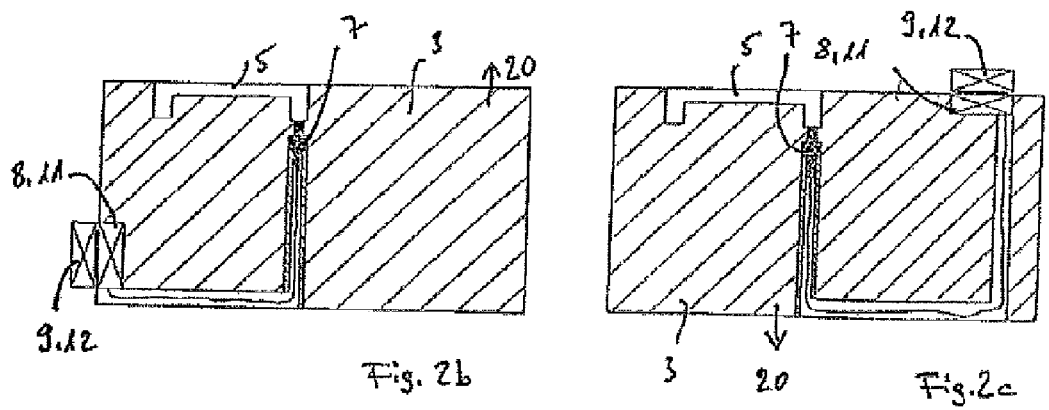

As demonstrated in FIG. 2a, the transmitter module 8 and receiving module 9 can also be disposed on a separation surface 6 which is perpendicular to the direction of movement 20 separating the mold insert 3 from the base plate 2. Alternatively, these modules 8, 9 can also be parallel to the direction of movement 20, as shown in FIG. 2b. Furthermore, the separation surface 6 can be positioned on the surface in which the cavity 5 is formed, as depicted in FIG. 2c. In this construction, the modules 8, 9 on the separation surface 6 are removed from each other during each demolding and afterwards brought together again.

Specifically, the transmitter module and receiving module 9 can also be constructed as an emitting module 11 and sensing module 12 enabling wireless transmission of the measurement data, for example by means of near field telemetry. For this purpose, the emitting module 11 can be powered by the sensing module 12 in a wireless manner or can be electrically supplied by a battery. In particular, the emitting module 11 and the sensing module 12 can be sealed hermetically. This facilitates cleaning and avoids the intrusion of contaminations.

In contrast to rotating systems, for example wheels, where measurement data are transmitted from a transmitter module on a moving part by means of telemetry to an opposite receiving module in a stationary part, no relative movement occurs between the transmitter module 8 and the receiving module 9 during a measurement in the measuring arrangement according to the invention. During a measurement, base plate and mold insert always rest against one another in an immobile manner. Therefore, more economical components can be used for the transmitter module and receiving module.

Preferably, the emitting module 11 can comprise a nonvolatile memory for storing configuration data.

Figure 3A:
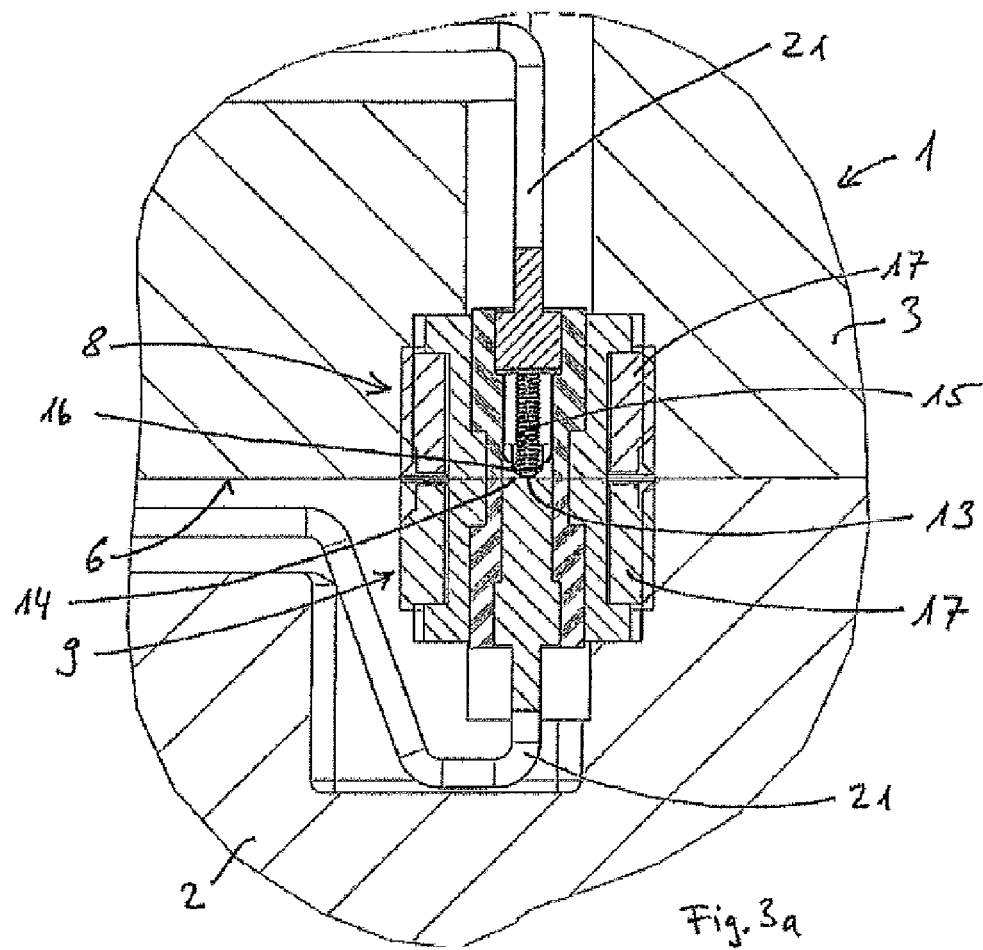
FIG. 3 shows a schematic representation, in sectional view, of a measuring arrangement according to the invention in the area of the separation surface at the transmitter module and the receiving module embodied as point contacts in a) the closed and b) the opened state as well as detailed views of three different embodiments thereof each in the closed state in c), e), and g) and in the opened state in d), f), and h), respectively.

In an alternative embodiment, the measurement data can be transmitted via point contacts 13 from the transmitting module 8 to the receiving module 9 wherein one of said modules 8, 9 is provided with a fixed contact 14 and the other with a spring contact 16. FIG. 3a shows a possible embodiment of a transmitting module 8 and receiving module 9 formed with a fixed contact 14 and a spring contact 16 in the closed state (3a) and the central portion in the opened state (3b) on the separation surface 6. It has to be pointed out that the contacts 14 and 16 can be exchanged with each other in the transmitting module 8 and the receiving module 9.

Apart from the fixed contact 14 and the spring contact 16, respectively, which are positioned centrally, the transmitting module 8 and receiving module 9 are essentially identical. They can be attached to the components 2, 3 by means of a threaded ring 17. A line 21 for transmission of the measurement data can extend from each of the modules 8, 9. The line can lead to a sensor 7, to a connector 10 or to another module 8, 9.

The fixed contact 14 has no moving parts wherein the spring contact 16 comprises a spring 15. Preferably, this fixed contact 14 is formed in the receiving module 9.

The fixed contact 14 is placed with its front surface on the separation surface 6 and is provided with a fixed metallic surface that is electrically connected to the line 21 attached on the module. This metallic surface is insulated whereby it makes no electrical contact to the component 2 or 3 in which the modules 8 or 9 are installed.

Figure 3B:
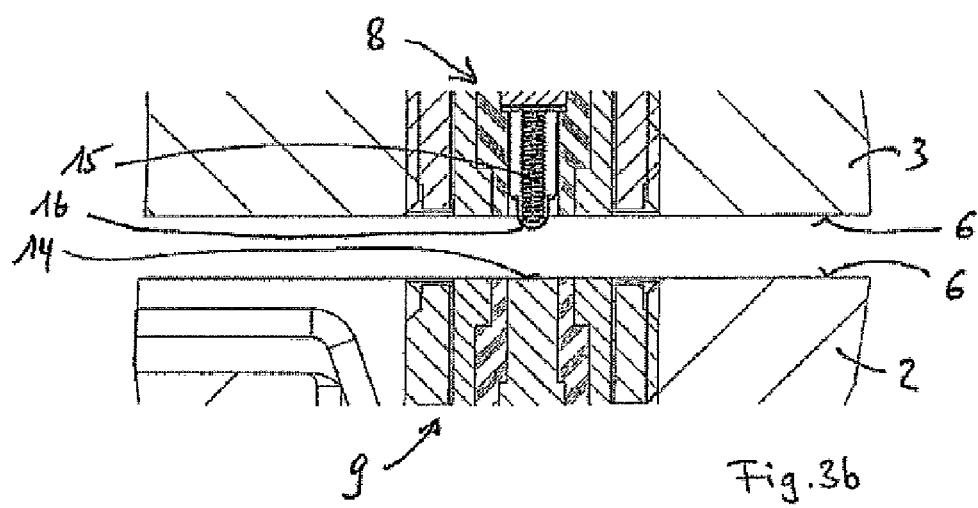

The spring contact 16 is preferably formed in the transmitter module 8. This moving contact is essentially identical to the fixed contact; however, a movable surface is formed instead of the fixed metallic surface. The spring 15 applies a spring force onto this movable surface in a direction perpendicular to the separation surface 6 towards the fixed contact 14. This force ensures that there is always established a point contact 13 to this opposed fixed metallic surface of the fixed contact 14 on the separation surface. From FIG. 3b showing the opened state can be seen that the spring contact 16 protrudes from the separation surface 6 due to the spring force if the fixed contact 14 is spaced apart. The measuring chain is interrupted in this position and no data can be transmitted. In the measuring arrangement of the invention, the two components 2, 3 rest against one another and the spring contact 16 no longer protrudes from the separation surface 6.

Figure 3C:
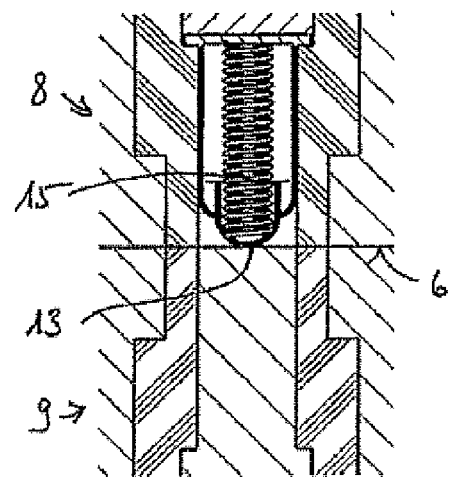
Figure 3D:
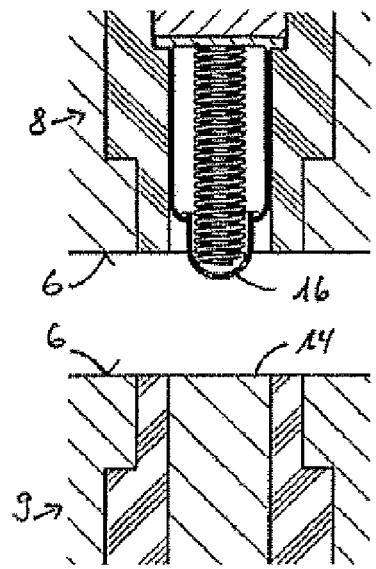

FIGS. 3c and 3d again show the portions including the fixed contact 14 and the spring contact 16.

Figure 3E:
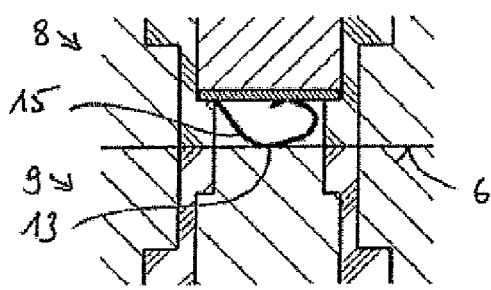
Figure 3F:
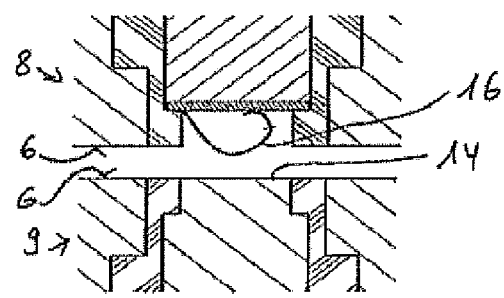
Figure 3G:
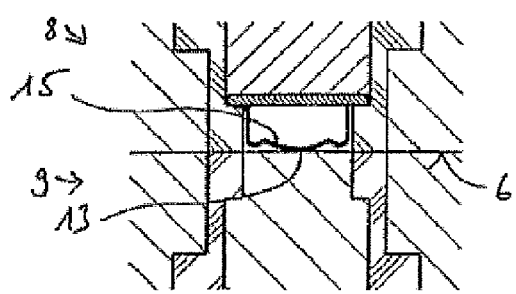
Figure 3H:
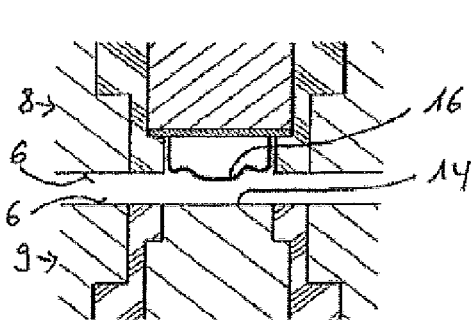

FIGS. 3e and 3f as well as 3g and 3h show alternative constructions in all of which the spring 15 directly forms the spring contact 16. FIGS. 3e and 3g show the closed states and FIGS. 3g and 3g the corresponding opened states. The opened states demonstrate the spring effects by which the spring contact 16 protrudes from the separation surface 6. These springs have the advantage to be suitable in applications according to FIG. 2b where the direction of movement 20 is parallel to the separation surface 6.

Figure 4A:
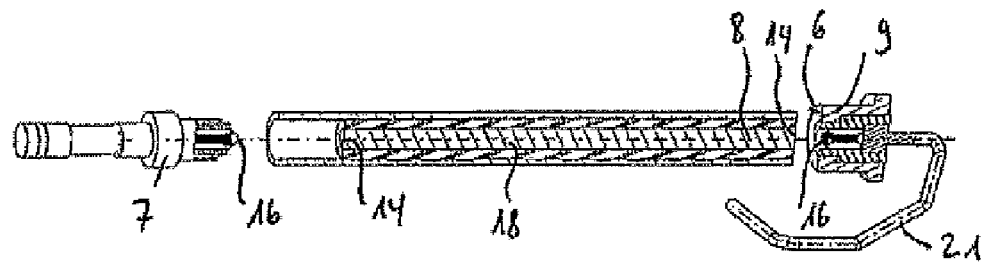
FIG. 4 shows a schematic representation of a sensor with extension wherein a) the extension is provided with a fixed point contact on both sides, and b) the extension is integral with the sensor which is provided with a point contact at the end of the extension.

In another embodiment depicted in FIG. 4a the sensor 7 itself is provided with a spring contact 16. This spring contact 16 can now function directly as the transmitter module 8. To bridge a distance, the sensor 7 can be extended with an electrical extension connection 18 of the desired length having at least a respective fixed contact 14. This electrical extension connection 18 can be formed at its other end to function as the described transmitter module 8 and can be provided either with a fixed contact 14 or with a spring contact 16. This facilitates mounting of the sensor because in this construction it must simply be introduced into the corresponding bore and is fixed in its position at its rear side by the attachment of the electrical extension connection 18. In this construction according to FIGS. 4*a* and *b*, the transmitter module 8 is the extended sensor 7.

Figure 4B:
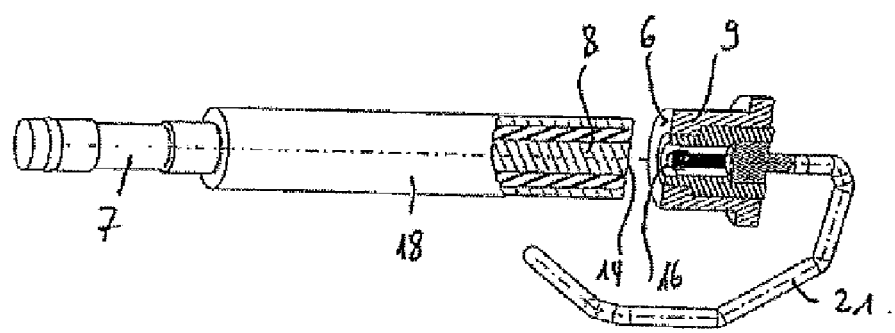

Alternatively, as depicted in FIG. 4*b*, the sensor 7 can also be integral with the electrical extension connection 18 again facilitating its mounting. If desired, the user can shorten the length of the electrical extension connection 18 to the required amount during mounting because the front face of the fixed contact 14 is fully planar. This simplifies the strategy while developing a tool.

Figure 5:
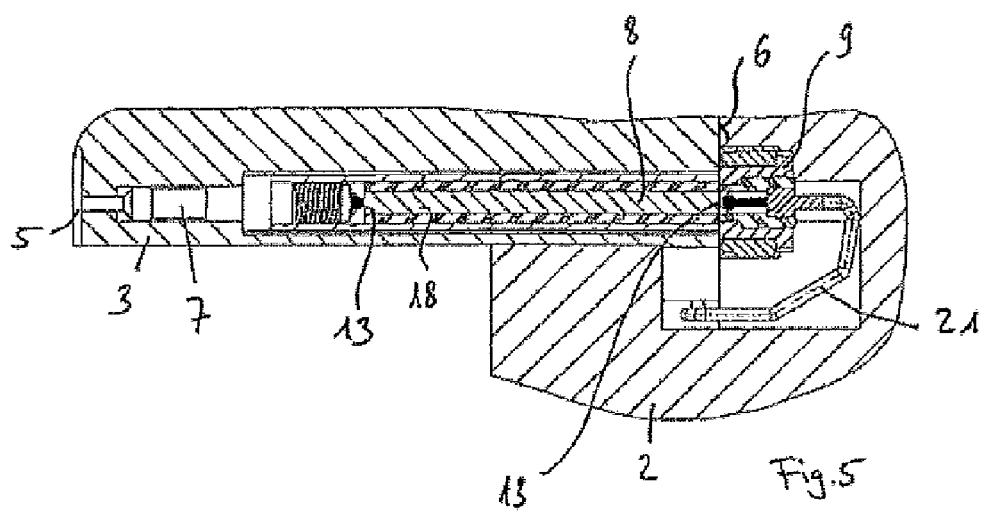
FIG. 5 shows a schematic representation of a measuring arrangement according to the invention having a sensor and extension with point contact.

FIG. 5 shows a sensor as depicted in FIG. 4*a* in its mounted state.

Figure 6:
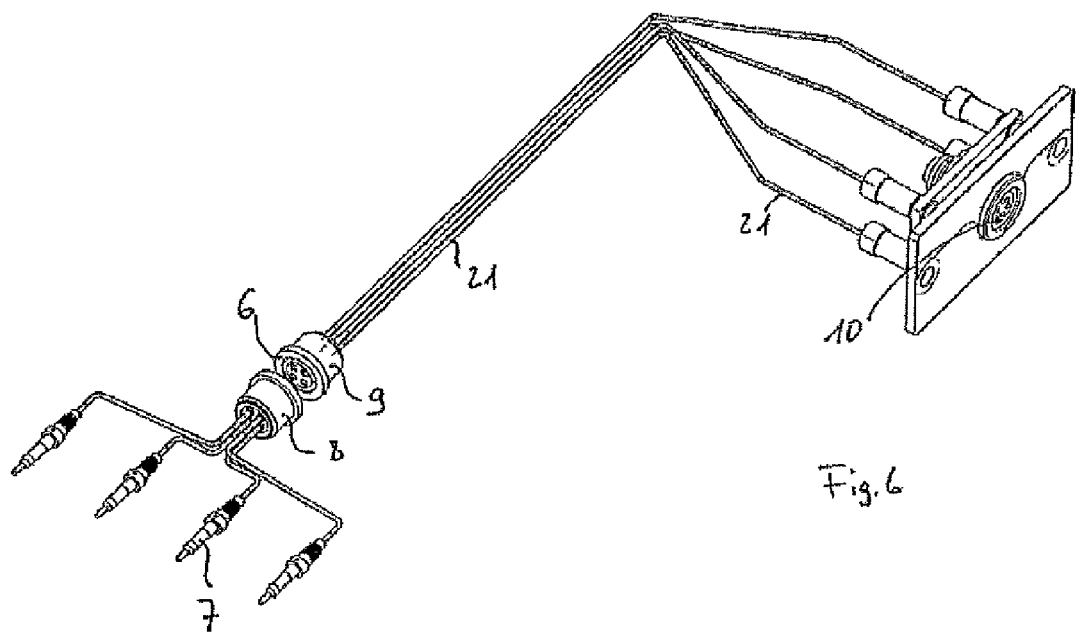
FIG. 6 shows a schematic representation of a measuring arrangement according to the invention having several sensors.

Another measuring arrangement according to the invention is represented in FIG. 6. In this arrangement the transmitter module 8 and receiving module 9 each comprise point contacts 13 whereby the measurement signals of several sensors 7 can be transmitted via a single transmitter module 8 to a single receiving module 9. Accordingly, several lines 21 extend from the receiving module 9 to a connector 10.

Figure 7:
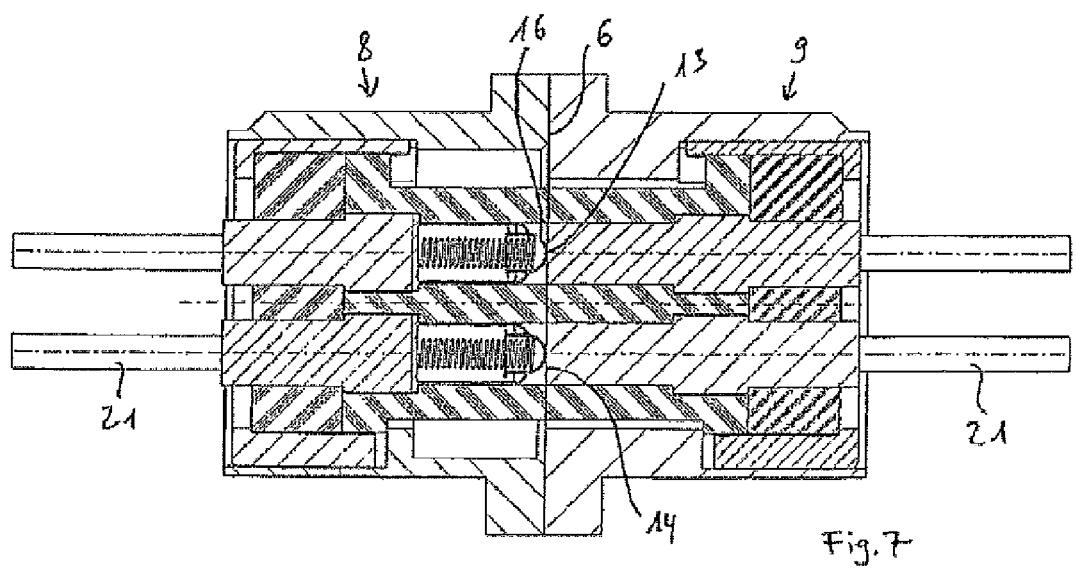
FIG. 7 shows a schematic representation of the transmitter module and receiving module with several point contacts.

FIG. 7 shows a transmitter module 8 and a receiving module 9 having several point contacts 13 arranged therein. Of course, also several emitting modules 11 and several sensing modules 12 can be disposed at this same site for simultaneous transmission of measurement data by different sensors or probes.

It is also possible to arrange the transmitter module 8 on a mold insert 3 that moves, in particular moves periodically or pivots, with respect to the base plate 2. The measuring arrangement is ready for transmission of the measurement data when the transmitter module 8 and receiving module 9 are facing each other. In particular, it is not necessary that the positions of the transmitter module 8 and receiving module 9 are exactly opposed to one another. Both possibilities for data transmission, by telemetry or by point contact, allow for a slight lateral displacement without impeding the data transmission or causing a damage to one of the components.

In the case of dial machines in which an operation is performed every 60° or 90° for example, different operation segments can be provided with sensors and, thus, with transmitter modules 8 which then make contact alternately one after the other to a single receiving module 9. This is for example achieved by periodical movements or swiveling between mold insert 3 and base plate 2. As soon as a transmitter module 8 lies opposite a receiving module 9 the measurement and data transmission can be started. An example of a four-step process would be the following: (1) insert components, (2) inject blue, (3) inject green, and (2) eject a two-colored part, for example a tooth brush. In steps (2) and (3), the pressure is measured and transmitted for process control.

FIG. 8 depicts a portion of an ejection mechanism. As can be seen from FIG. 8, transmitter module 8 and receiving module 9 can also be mounted on an ejection mechanism of an injection molding system operated to eject the finished parts. Specifically, the sensor 7 can be arranged behind an ejector pin 19.

It has to be noted that for many applications the measuring arrangement uses only one measuring line attached opposite of the injection molding system 1 in a highly insulating manner. The earth lead can be directly via the tool. This exceedingly simplifies the measuring arrangement which in turn results in lower costs. If two lines are required, for example for temperature measurements, the transmitter module 8 and receiving module 9 can also connect several lines with each other or an transmit several data simultaneously by telemetry.

List of reference numerals

| | |
|---|---|
| 1 | injection molding system |
| 2 | base plate |
| 3 | mold insert |
| 5 | Cavity |
| 6 | separation surface |
| 7 | Sensor |
| 8 | transmitter module |
| 9 | receiving module |
| 10 | Connector |
| 11 | emitting module |
| 12 | sensing module |
| 13 | point contact |
| 14 | fixed contact |
| 15 | Spring |
| 16 | spring contact |
| 17 | threaded ring |
| 18 | electrical extension connection |
| 19 | ejector pin |
| 20 | direction of movement |
| 21 | Line |

The invention claimed is:

1. A measuring arrangement for measuring one or more pressures and/or temperatures in an injection-molding system, said arrangement comprising:
a base plate and at least one mold insert with at least part of a cavity wherein the base plate and the mold insert rest against one another in a releasable manner on at least one common separation surface,
at least one sensor within the mold insert for the detection of pressures and/or temperatures,
a transmitter module in the mold insert on the separation surface electrically connected to the sensor, and
a receiving module in the base plate on the separation surface opposite the transmitter module,
wherein the transmitter module is configured to transmit measurement data to the receiving module and to an evaluation device electrically connected to the receiving module, the receiving module and the evaluation device are configured to receive measurement data transmitted from the transmitter module, and
wherein the transmitter module and the receiving module on the separation surface are planar and can be separated.

2. A measuring arrangement according to claim 1 wherein the transmitter module and the receiving module can transmit measurement data by means of at least one point contact each.

3. A measuring arrangement according to claim 2 wherein the point contact on one side is a spring contact applying, by means of a spring, a force onto the other point contact perpendicularly to the separation surface, and that on the other side it is a fixed contact without movable parts.

4. A measuring arrangement according to claim 1, wherein the sensor is provided with a point contact electrically contacting the transmitter module directly or by means of a rigid electrical extension connection.

5. A measuring arrangement according to claim 1 wherein the transmitter module is an emitting module and the receiving module is a sensing module for wireless transmission of the measurement data.

6. A measuring arrangement according to claim 5 wherein the emitting module and the sensing module transmit measurement data by means of near field telemetry.

7. A measuring arrangement according to claim 6, wherein the emitting module comprises a battery or is electrically supplied by the sensing module in a wireless manner.

8. A measuring arrangement according to claim 5, wherein the emitting module and the sensing module are hermetically sealed.

9. A measuring arrangement according to claims 5, wherein the emitting module comprises a non-volatile memory for storing configuration data.

10. A measuring arrangement according to claim 1, wherein the sensor is a piezoelectric tool inner pressure sensor or a thermocouple.

11. A measuring arrangement according to claim 1, wherein the transmitter module is electrically connected to several sensors and can simultaneously transmit signals of several sensors to the receiving module.

12. A measuring arrangement according to according to claim 1, wherein said measuring arrangement comprises several transmitter modules each electrically connected to at least one sensor.

13. A measuring arrangement according to claim 12 wherein each respective on of at least two transmitter modules is assigned to a respective single receiving module wherein for detecting and transmitting measurement data the base plate is movable with respect to the mold insert in such a way that each of the transmitter modules alternately one after the other lies opposite the receiving module.

14. A measuring arrangement according to according to claim 1, wherein the mold insert is disposed opposite the base plate in a periodically movable or pivotable manner.

15. A measuring arrangement according to according to claim 1, wherein the sensor, the transmitter module and the receiving module are positioned in an ejection mechanism (19) serving to eject finished formed parts from the injection molding system.

16. A measuring arrangement according to according to claim 1, wherein the separation surface is perpendicular to the direction of movement separating the mold insert and the base plate.

17. A measuring arrangement according to any of the p according to claim 1, wherein the separation surface is parallel to the direction of movement separating the mold insert and the base plate.

18. A measuring arrangement according to claim 3, wherein the sensor is provided with a point contact electrically contacting the transmitter module directly or by means of a rigid electrical extension connection.

* * * * *